(12) United States Patent
Lee

(10) Patent No.: US 11,115,119 B1
(45) Date of Patent: Sep. 7, 2021

(54) RF-FSO LINKAGE METHOD AND GROUND STATION SYSTEM PERFORMING THE SAME

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 0 days.

(21) Appl. No.: 17/165,489

(22) Filed: Feb. 2, 2021

(30) Foreign Application Priority Data

Dec. 28, 2020 (KR) ........................ 10-2020-0184774

(51) Int. Cl.
*H04B 10/118* (2013.01)
*H04B 7/185* (2006.01)

(52) U.S. Cl.
CPC ....... *H04B 10/118* (2013.01); *H04B 7/18519* (2013.01); *H04B 7/18526* (2013.01)

(58) Field of Classification Search
CPC .............. H04B 10/118; H04B 7/18519; H04B 7/18526
See application file for complete search history.

(56) References Cited

U.S. PATENT DOCUMENTS

| | | | | |
|---|---|---|---|---|
| 5,946,120 | A * | 8/1999 | Chen ..................... | H04B 10/11 398/155 |
| 6,763,195 | B1 * | 7/2004 | Willebrand ........ | H04B 10/1123 398/115 |
| 7,453,835 | B1 * | 11/2008 | Coty ................. | H04B 10/1149 370/310 |
| 2012/0068880 | A1 * | 3/2012 | Kullstam ................. | H01Q 3/26 342/54 |
| 2018/0269972 | A1 * | 9/2018 | Djordjevic ......... | H04B 10/2575 |
| 2019/0261262 | A1 | 8/2019 | Stiles et al. | |

OTHER PUBLICATIONS

Swaminathan et al., "Performance Analysis of HAPS-Based Relaying for Hybrid FSO/RF Downlink Satellite Communication," IEEE 91st Vehicular Technology Conference (VTC2020-Spring), May 25, 2020, total 5 pages.
S. K. Shrivastava et al., "Threshold optimization for modified switching scheme of hybrid FSO/RF system in the presence of strong atmospheric turbulence," Photonic Network Communications, Aug. 28, 2020, total 11 pages.
In Keun Son et al., "A survey of free space optical networks," Digital Communications and Networks 3, 2017, pp. 67-77, Elsevier.

* cited by examiner

*Primary Examiner* — Brenda H Pham
(74) *Attorney, Agent, or Firm* — Studebaker & Brackett PC

(57) ABSTRACT

Provided is a ground station system for performing a radio frequency-free space optics (RF-FSO) linkage method, the ground station system including a first receiver including a first antenna configured to receive an optical signal including data from a satellite; a second receiver including a second antenna configured to receive a radio frequency (RF) signal including data from the satellite; and a processor configured to estimate data that is determined to have been transmitted from the satellite using the data received from the first receiver and thereby decoded and the data received from the second receiver and thereby decoded and transmit the estimated data to a data server, and thereby providing satellite communication through another satellite communication link regardless of a degradation in any one satellite communication link performance.

10 Claims, 8 Drawing Sheets

RF-FSO LINKAGE METHOD AND GROUND STATION SYSTEM PERFORMING THE SAME

CROSS-REFERENCE TO RELATED APPLICATIONS

This application claims the benefit under 35 USC § 119(a) of Korean Patent Application No. 10-2020-0184774 filed on Dec. 28, 2020 in the Korean Intellectual Property Office, the entire disclosure of which is incorporated herein by reference for all purposes.

BACKGROUND

1. Field

At least one example embodiment relates to a radio frequency-free space optics (RF-FSO) linkage method, and more particularly, to an RF-FSO linkage method and a ground station system for performing the same.

2. Description of Related Art

An artificial satellite refers to an object that may fly in a predetermined circle or an elliptical orbit around the earth. The artificial satellite may be mounted on a launch vehicle and then fired to enter a predetermined orbit in the space and to perform a variety of predefined operations in the orbit. The artificial satellite functions to exchange data with other ground-based communication/electronic devices (e.g., satellite antennas and set-top boxes connected thereto) and/or to observe the ground surface while orbiting the earth.

To control, for example, monitor the artificial satellite or the launch vehicle and to receive data gathered by the artificial satellite, a space ground station is installed on the ground. The space ground station may communicate with the artificial satellite based on a standardized frequency and communication protocol, may transmit a control signal for a specific operation (e.g., photographing) to the artificial satellite and/or receive data (e.g., image data on the ground surface) acquired by the artificial satellite based on the specific operation, and may perform a variety of processing based on the received data.

Currently, about 1,600 artificial satellites are orbiting the earth and a number of artificial satellites around the earth are expected to increase as a space market is evolved from government-led development to private-led development.

However, as an amount of data exchanged between a ground station and an artificial satellite increase, it becomes increasingly difficult to transmit and receive all data through radio frequency (RF) communication within a time in which the artificial satellite passes through a transmission/reception area of the ground station. Currently, research on introduction of communication using free space optics (FSO), that is, a laser is ongoing.

However, in the case of communication using a laser, communication performance may be degraded based on weather conditions, such as cloud or rain between the earth and the satellite. Accordingly, there is a need for a method that may maintain a communication link even in such weather conditions.

SUMMARY

At least one example embodiment provides a radio frequency-free space optics (RF-FSO) linkage method having a plurality of satellite communication links and a ground station system for performing the same.

At least one example embodiment also provides a method that may maintain a satellite communication link even in poor weather conditions.

According to an aspect of at least one example embodiment, there is provided a ground station system for performing an RF-FSO linkage method, the ground station system including a first receiver including a first antenna configured to receive an optical signal including data from a satellite; a second receiver including a second antenna configured to receive a radio frequency (RF) signal including data from the satellite; and a processor configured to estimate data that is determined to have been transmitted from the satellite using the data received from the first receiver and thereby decoded and the data received from the second receiver and thereby decoded and transmit the estimated data to a data server, and thereby providing satellite communication through another satellite communication link regardless of a degradation in any one satellite communication link performance.

The processor may be configured to determine a relatively excellent signal quality between a first signal quality of a first signal that is the optical signal received from the first receiver and a second signal quality of a second signal that is the RF signal received from the second receiver, and to estimate data transmitted from the satellite using a signal corresponding to the relatively excellent signal quality between the first signal quality and the second signal quality if one of the first signal quality and the second signal quality is less than or equal to a threshold.

The processor may be configured to compare a first data estimation performance estimated from the first signal and a second data estimation performance estimated from the second signal if all of the first signal quality and the second signal quality are greater than the threshold, and to select estimation data of a data source having a relatively excellent estimation performance between the first data estimation performance and the second data estimation performance in a specific time section having different estimation data and transmit the selected estimation data to the data server.

The processor may be configured to apply a first weight to the first signal and a second weight to the second signal inversely proportional to the first signal quality and the second signal quality if all of the first signal quality and the second signal quality are greater than the threshold, and to decode data in a state in which the first signal applied with the first weight and the second signal applied with the second weight are combined.

The processor may include a data processing unit configured to process first data received using optical tracking from the first receiver and second data received using RF signal tracking from the second receiver, in a baseband; and a data reformatting unit configured to format at least one of the first data and the second data and match a format and synchronization point in time between the first data and the second data.

A demodulator of the second receiver may be configured to transfer, to the data processing unit, the second data acquired by demodulating a second signal received from the second receiver to a CCSDS format for space communication, and the data reformatting unit may be configured to format the first data processed in the baseband to the CCSDS format.

The processor may further include a best source data selection unit configured to select at least one of the first data and the second data based on a signal quality and a data estimation performance associated with the first data and the second data having the same format and synchronization point in time and transmit the selected data to the data server.

The first antenna may be a ground station telescope configured to track the satellite through the optical signal and perform line-of-sight wave (LOS) communication with the satellite, and the second antenna may be a ground station antenna configured to track the satellite through the RF signal and perform communication with the satellite.

The ground station system may further include a first transmitter configured to transmit the optical signal to the satellite; and a second transmitter configured to transmit the RF signal to the satellite. The first receiver and the first transmitter may constitute a first communicator, and the second receiver and the second transmitter may constitute a second communicator, and the first antenna and the second antenna may be configured to be oriented in the same direction and change a direction of the second antenna if all of a first signal that is the optical signal and a second signal that is the RF signal have a received signal quality less than or equal to a threshold.

The ground station system may further include a monitoring controller configured to combine with the first communicator and the second communicator in an interoperable manner, monitor the first signal received from the first receiver and the second signal received from the second receiver, and control directions of the first antenna and the second antenna. The monitoring controller is configured to control the first antenna and the second antenna to be oriented in the same first direction, and to control the second antenna to perform non-line-of-sight wave (NLOS) communication with the satellite by changing the direction of the second antenna to a second direction if all of the first signal and the second signal have the received signal quality less than or equal to the threshold.

The processor may be configured to receive the optical signal from the satellite through the first receiver in a first direction and perform LOS communication with the satellite if the first signal has a received signal quality greater than the threshold, and to receive the RF signal from the satellite through the second receiver in a second direction and perform NLOS communication with the satellite.

According to another aspect of at least one example embodiment, there is provided an RF-FSO linkage method performed by a ground station system, the method including an optical signal reception control process of controlling a first receiver including a first antenna to receive an optical signal including data from a satellite; an RF signal reception control process of controlling a second receiver including a second antenna to receive an RF signal including data from the satellite; a data estimation process of estimating data that is determined to have been transmitted from the satellite using the data received from the first receiver and thereby decoded and the data received from the second receiver and thereby decoded and transmit the estimated data to a data server; and an estimation data transmission process of transmitting estimation data that is determined to have been transmitted from the satellite to the data server. The data estimation process further includes a signal quality determination process of determining a relatively excellent signal quality between a first signal quality of a first signal that is the optical signal received from the first receiver and a second signal quality of a second signal that is the RF signal received from the second receiver, and the data estimation process includes estimating data transmitted from the satellite using a signal corresponding to the relatively excellent signal quality between the first signal quality and the second signal quality if one of the first signal quality and the second signal quality is less than or equal to a threshold.

The data estimation process may further include a data estimation performance comparison process of comparing a first data estimation performance estimated from the first signal and a second data estimation performance estimated from the second signal if all of the first signal quality and the second signal quality are greater than the threshold, and the estimation data transmission process may include selecting estimation data of a data source having a relatively excellent estimation performance between the first data estimation performance and the second data estimation performance in a specific time section having different estimation data and transmitting the selected estimation data to the data server.

According to some example embodiments, the aforementioned ground station system for performing the RF-FSO linkage method may provide satellite communication through another satellite communication link regardless of a degradation in any one satellite communication link performance.

The ground station system for performing the RF-FSO linkage method may maintain a satellite communication link even in poor weather conditions, such as cloud or rain between the earth and a satellite.

Other features and aspects will be apparent from the following detailed description, the drawings, and the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
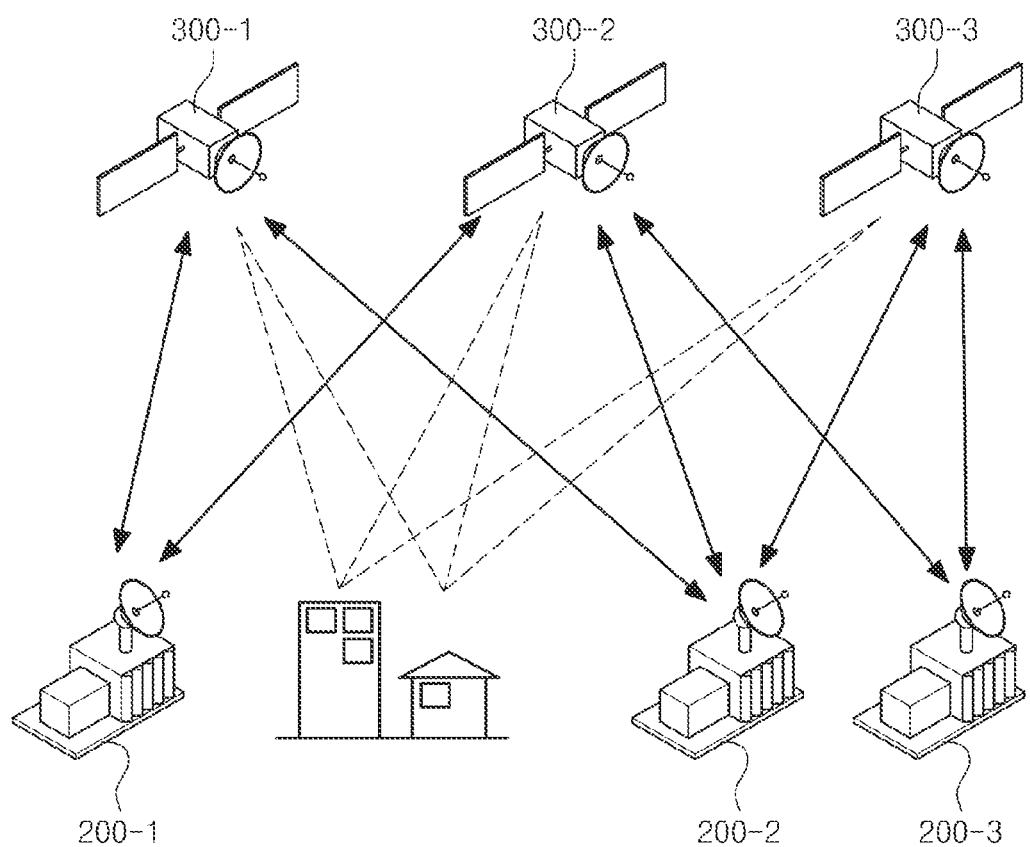
FIG. 1 illustrates an example of an artificial satellite and a ground station.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Unless the context clearly indicates otherwise, like reference numerals refer to like elements used throughout. Also, components used herein, such as, for example, terms "-unit/module," etc., may be implemented as software and/or hardware. Depending on example embodiments, each component with "-unit/module," etc., may be implemented as a single piece of software, hardware and/or a desired part, and also may be implemented as a plurality of pieces of software, hardware, and/or desired parts.

It should be noted that if it is described that one component is "connected," "coupled," or "joined" to another component, a third component may be "connected," "coupled," and "joined" between the first and second components, although the first component may be directly connected, coupled, or joined to the second component. On the contrary, it should be noted that if it is described that one component is "directly connected," "directly coupled," or "directly joined" to another component, a third component may be absent. Expressions describing a relationship between components, for example, "between," directly between," or "directly neighboring," etc., should be interpreted to be alike.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. As used herein, the term "and/or" includes any and all combinations of one or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments of a radio frequency-free space optics (RF-FSO) linkage method and a ground station system for performing the same are described.

FIG. 1 illustrates an example of an artificial satellite and a ground station.

At least one ground station 200 (200-1 to 200-N) may be configured to communicate with at least one artificial satellite 300 (300-1 to 300-M) based on a predetermined communication protocol.

According to an example embodiment, one of the ground stations 200-1 to 200-N may communicate with the plurality of artificial satellites 300-1 to 300-M, and/or the plurality of ground stations 200-1 to 200-N may communicate with one of the artificial satellites 300-1 to 300-M.

For example, referring to FIG. 1, the first ground station 200-1 may communicably connect to the first artificial satellite 300-1 and the second artificial satellite 300-2 among the first to third artificial satellites 300-1, 300-2, and 300-3 and accordingly, may transmit a control signal to the first artificial satellite 300-1 and the second artificial satellite 300-2, or may receive satellite data from the first artificial satellite 300-1 and the second artificial satellite 300-2. In this case, the first ground station 200-1 may not communicate with the third artificial satellite 300-3 and accordingly, may not transmit a control signal to or receive data from the third artificial satellite 300-3. Also, the second ground station 200-2 may communicably connect to the first artificial satellite 300-1, the second artificial satellite 300-2, and the third artificial satellite 300-3, and the third ground station 200-3 may communicably connect to the second artificial satellite 300-2 and the third artificial satellite 300-3.

Accordingly, the first artificial satellite 300-1 may communicate with the first ground station 200-1 and the second ground station 200-2, the second artificial satellite 300-2 may communicate with the first ground station 200-1, the second ground station 200-2, and the third ground station 200-3, and the third artificial satellite 300-3 may communicate with the second ground station 200-2 and the third ground station 200-3.

Figure 2:
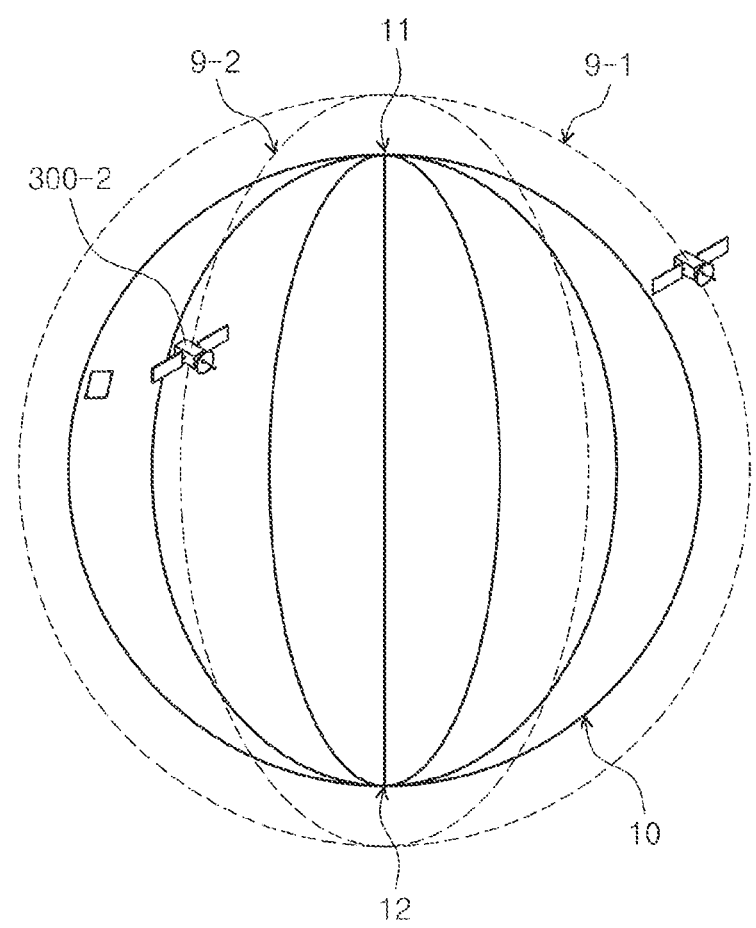
FIG. 2 illustrates an example of describing a movement of an artificial satellite.

Relations between the first to third ground stations 200-1 to 200-3 and the first to third artificial satellites 300-1 to 300-3 of FIG. 2 are provided as an example only. In addition thereto, the first to third ground stations 200-1 to 200-3 and the first to third artificial satellites 300-1 to 300-3 may be communicably interconnected through a variety of methods.

Depending on example embodiments, specific at least one ground station 200 (200-1 to 200-N) may be configured to communicate only with specific at least one artificial satellite 300 (300-1 to 300-M). On the contrary, specific at least one artificial satellite 300 (300-1 to 300-M) may be configured to communicate only with specific at least one ground station 200 (200-1 to 200-N).

Also, at least one ground station 200 (200-1 to 200-N) may be designed to communicate with only at least one artificial satellite 300 (300-1 to 300-M) moving in a relatively near distance.

That is, at least one ground station 200 (200-1 to 200-N) corresponding to at least one artificial satellite 300 (300-1 to 300-M) may be determined based on a distance therebetween.

FIG. 2 illustrates an example of describing a movement of an artificial satellite.

Referring to FIG. 2, artificial satellites 300-1 and 300-2 move along the respective corresponding orbits 9-1 and 9-2 formed in the atmosphere of the earth 10. In this case, the orbits 9-1 and 9-2 of the artificial satellites 300-1 and 300-2 may be polar orbits. The polar orbits refer to orbits orthogonal through or around the north pole 11 and the south pole 12. If the artificial satellites 300-1 and 300-2 move along the polar orbits, the rotation of the earth 10 may allow the artificial satellites 300-1 and 300-2 to pass over most of the regions on the earth 10. Therefore, if the artificial satellites 300-1 and 300-2 are equipped with terrestrial photographing equipment, the artificial satellites 300-1 and 300-2 may capture a substantial portion of the ground surface.

According to an example embodiment, the artificial satellite 300 may include a small or micro artificial satellite, for example, CubeSat. The CubeSat refers to a micro artificial satellite with a volume of about 10 cm^3 or less and a mass of 1.33 kg or less. The CubeSat is small, light, mountable with a camera, and relatively low-priced for manufacture and launch, however, has a relatively insufficient space to store data. Accordingly, the CubeSat caches gathered data during a short period of time and discards or deletes the data after a predetermined period of time.

Hereinafter, a ground station system for performing the aforementioned RF-FSO linkage method between a ground station and a satellite is described. Here, the RF-FSO represents radio frequency (RF) and free-space optical (FSO).

Therefore, the RF-FSO linkage method refers to a communication method between the ground station 200 and the artificial satellite 300 through an optical link and an RF link formed between the ground station 200 and the artificial satellite 300 (hereinafter, simply satellite 300). Herein, terms "satellite" and "artificial satellite" may be interchangeably used.

Figure 3:
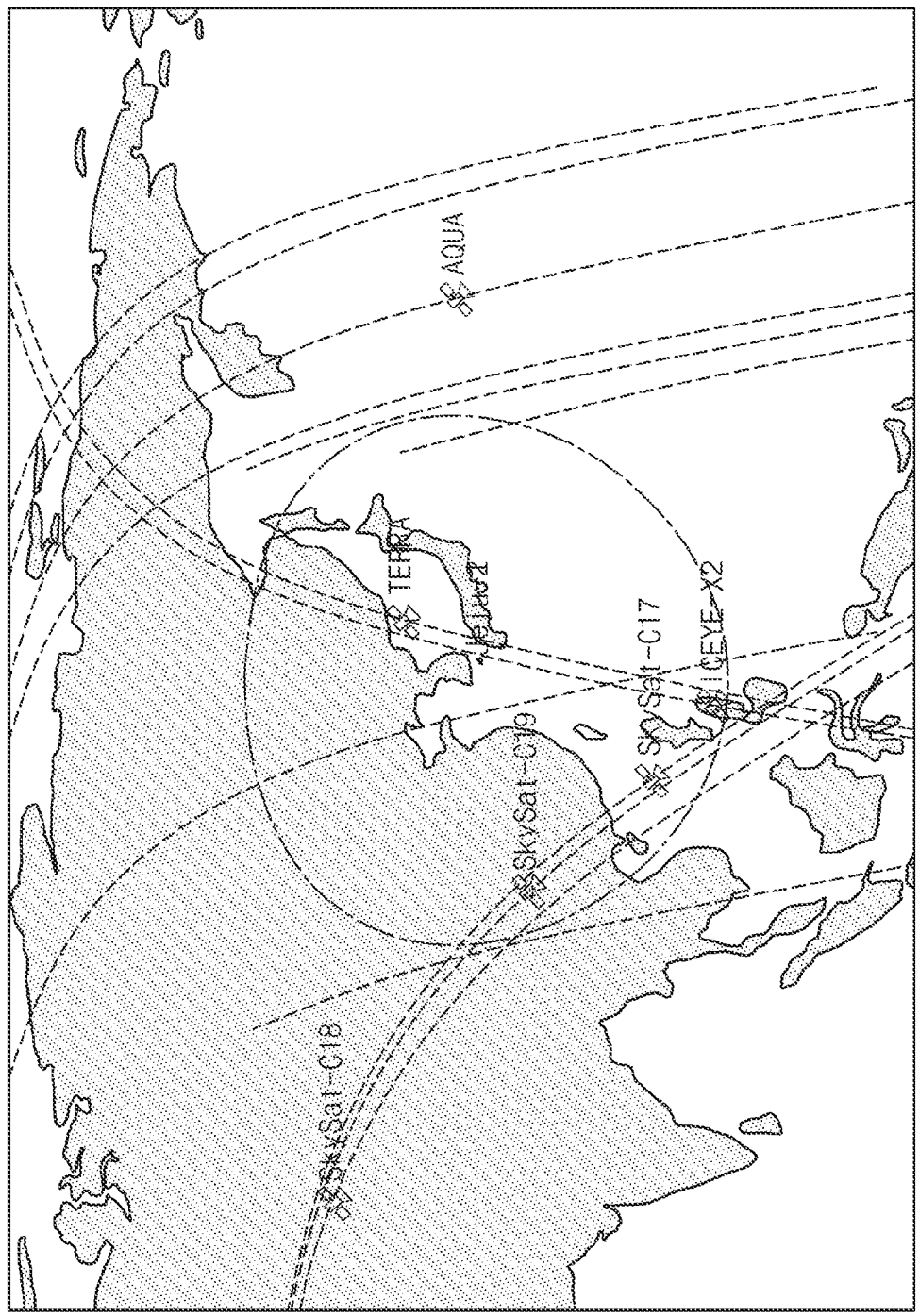
FIG. 3 illustrates an example of artificial satellites that orbit over the Korean Peninsula and its surroundings and orbits thereof according to an example embodiment.

FIG. 3 illustrates an example of artificial satellites that orbit over the Korean Peninsula and its surroundings and orbits thereof according to an example embodiment. Referring to FIG. 3, SkySat-17 to SkySat-19 are artificial satellites launched in 2020. In detail, three of Planet's commercial SkySat (SkySat-16, -17, and -18) were launched on a stack of 58 SpaceX Starlink-8 satellites on Jun. 13, 2020 aboard a Falcon 9 rocket. Also, three more SkySat-19, -20, and -21 hitched a ride on another SpaceX mission on Aug. 18, 2020.

Built by Maxar Technologies, each of the SkySat satellites weighs around 110 kg at launch. Optical instruments of the SkySats may produce images of Earth with a resolution of 50 cm. In addition to SkySat-17 to SkySat-19, artificial satellites such as ICEYE-X2, TERRA, AQUA form their orbits over the Korean Peninsula and its surroundings.

Figure 4:
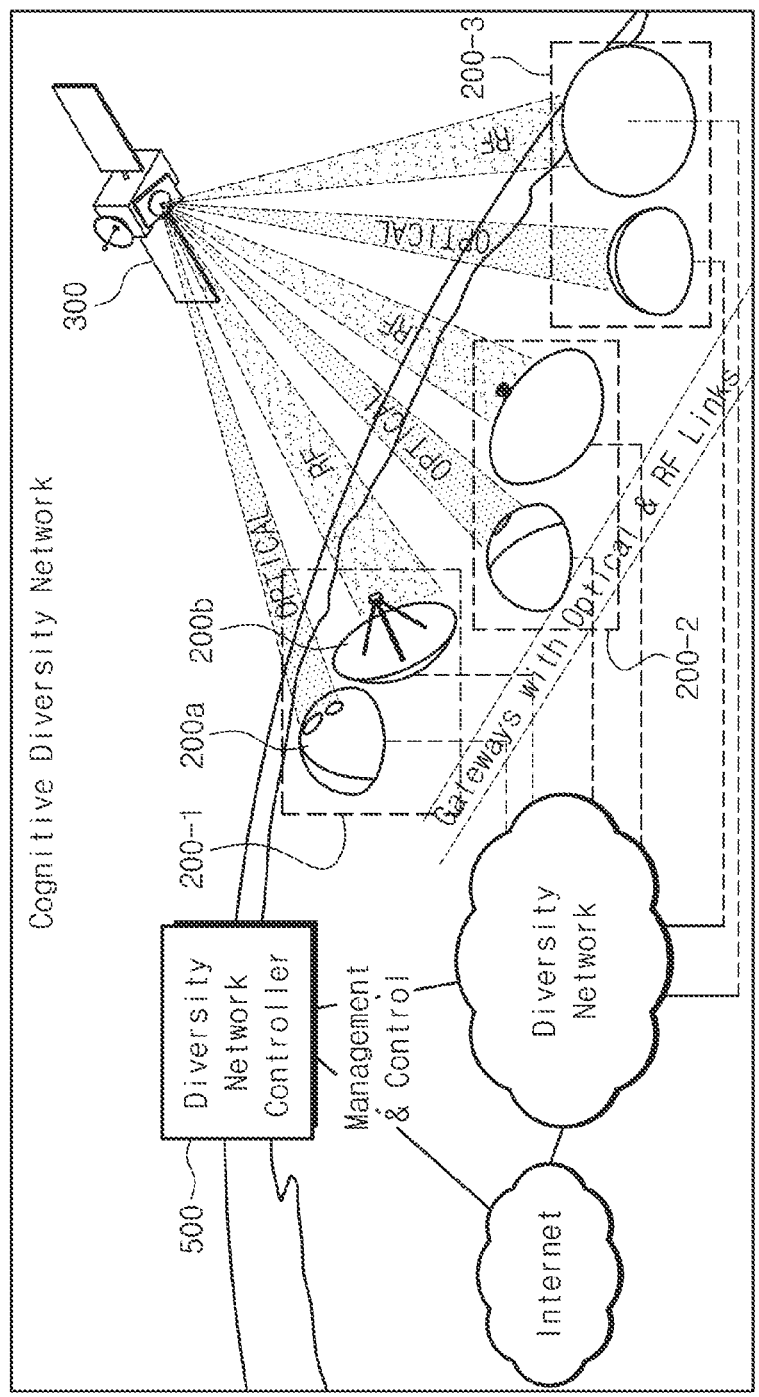
FIG. 4 illustrates an example of a configuration of a free-space optical (FSO) satellite network according to an example embodiment.

FIG. 4 illustrates an example of a configuration of an FSO satellite network according to an example embodiment. Referring to FIG. 4, the FSO satellite network may include the satellite 300 and the plurality of ground stations 200-1 to 200-3. Here, although a number of the plurality of ground stations 200-1 to 200-3 is illustrated as three, it is for simplicity of description and thus, it may be implemented as N ground stations 200-1 to 200-N.

Each of the plurality of ground stations 200-1 to 200-3 may perform wireless communication with the satellite 300 through an optical link and an RF link. For example, the ground station 200-1 may perform wireless communication with the satellite 300 through an optical communication apparatus 200*a* and an RF communication apparatus 200*b*.

To perform the RF-FSO linkage method, the development of an optical ground station system (OGS) and interoperability with an optical satellite terminal (OST) are required. Also, atmospheric mitigation techniques, such as, for example, site diversity, cognitive networking, and hybrid laser communication/RF networks, are required.

The optical communication apparatus 200*a* and the RF communication apparatus 200*b* may be managed and controlled by a diversity network controller 500. Therefore, a ground station system may receive a communication service using the satellite 300 and a plurality of satellite communication links through the diversity networks managed and controlled by the diversity network controller 500.

Figure 5:
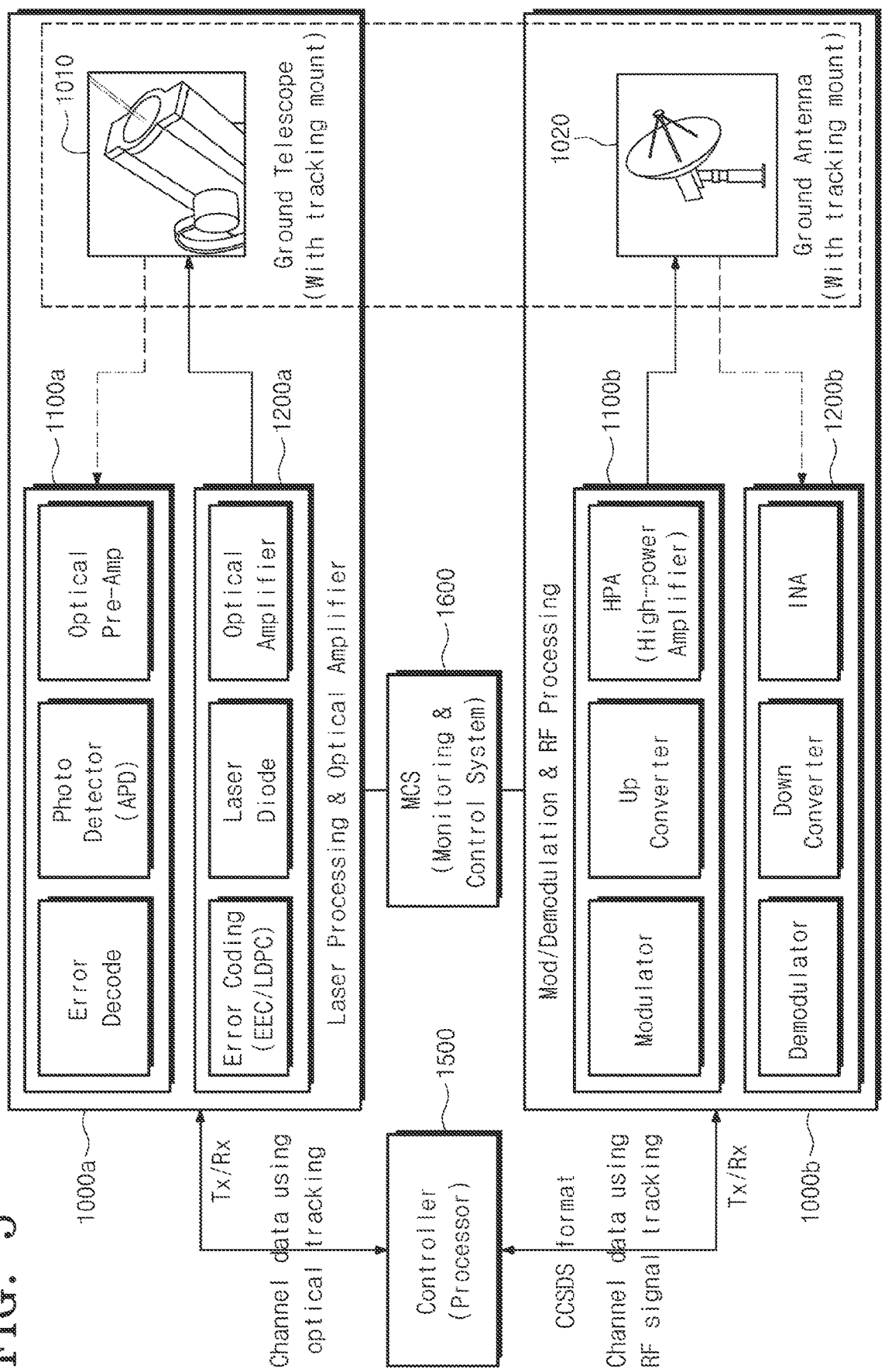
FIGS. 5 and 6 illustrate examples of a system configuration of implementing a hybrid optical ground station system (OGS) concept to perform an FSO mission according to an example embodiment.
Figure 6:
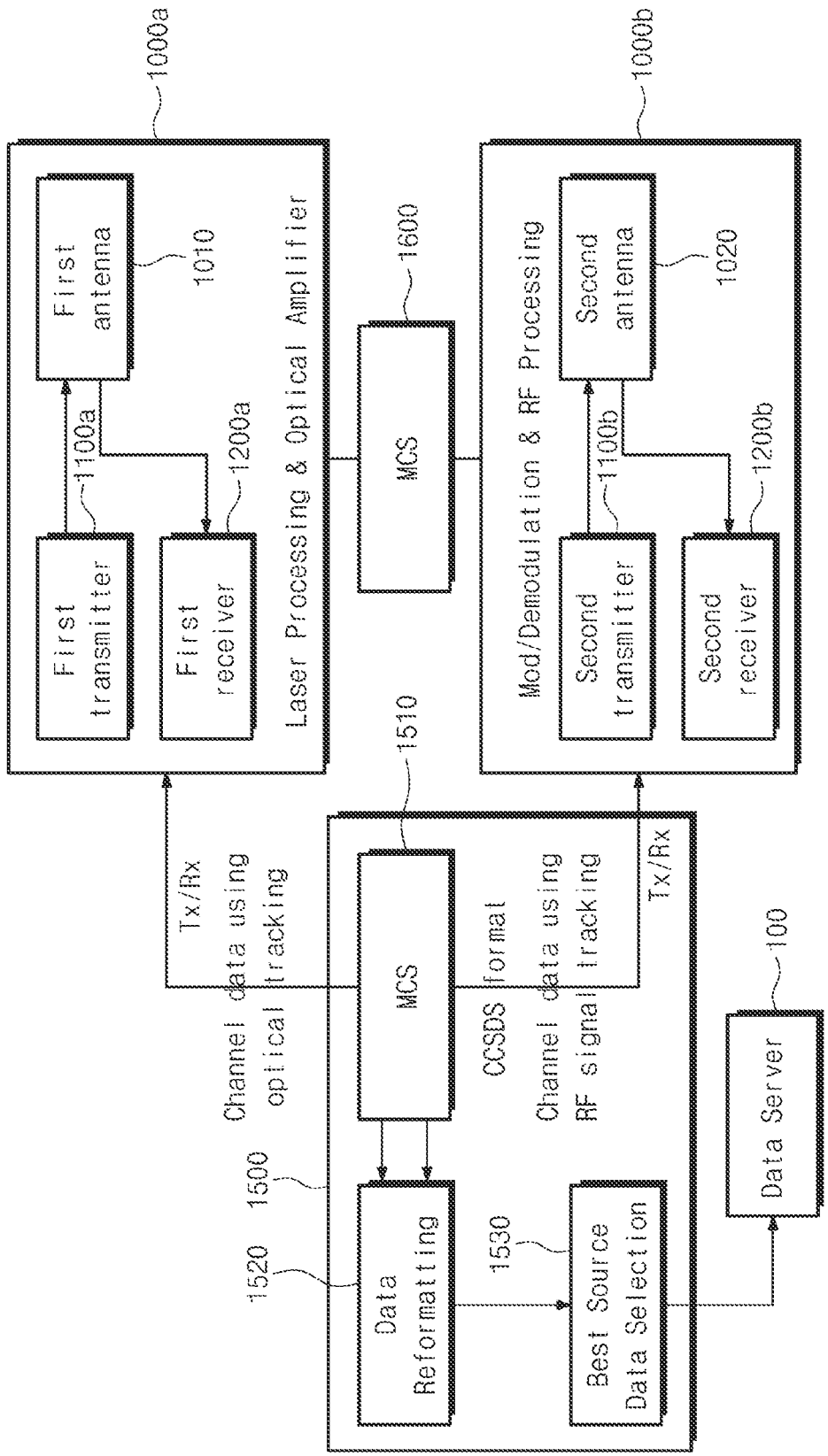

FIGS. 5 and 6 illustrate examples of a system configuration of implementing a hybrid optical ground station system (OGS) concept to perform an FSO mission according to an example embodiment. FIG. 5 is a diagram illustrating an example of a configuration of a communicator of a ground station system according to an example embodiment, and FIG. 6 illustrates an example of a configuration of a processor in a baseband of a ground station system according to an example embodiment.

Referring to FIGS. 5 and 6, the ground station system for performing the RF-FSO linkage method may include a first communicator 1000*a*, a second communicator 1000*b*, and a processor 1500. Here, the first communicator 1000*a* may include a first transmitter 1100*a* and a first receiver 1200*a*. The second communicator 1000*b* may include a second transmitter 1100*b* and a second receiver 1200*b*. Here, satellite communication between a ground station and a satellite may be mainly performed through a downlink (DL). Therefore, the ground station system for performing the RF-FSO linkage method may include the first receiver 1200*a*, the second receiver 1200*b*, and the processor 1500.

The first communicator 1000*a* may perform optical communication with the satellite 300 through an optical communication link with the satellite 300. To this end, the first communicator 1000*a* may include a first antenna 1010 configured to receive an optical signal including data from the satellite. The first receiver 1200*a* may include the first antenna 1010 configured to receive the optical signal including the data from the satellite. The first antenna 1010 may be a ground station telescope configured to track the satellite through the optical signal and to perform LOS communication with the satellite.

The first transmitter 1100*a* may be configured to transmit the optical signal to the satellite. The first transmitter 1100*a* may include an error coding unit, a laser diode, and an optical amplifier. The first receiver 1200*a* may be configured to receive the optical signal from the satellite. The first receiver 1200*a* may include an optical pre-amplifier, a photo detector, and an error decoder.

The second communicator 1000*b* may perform RF communication with the satellite 300 through an optical communication link with the satellite 300. To this end, the first communicator 1000*a* may include a second antenna 1020 configured to receive an RF signal including data from the satellite. The first receiver 1200*a* may include the second antenna 1020 configured to receive the RF signal including the data from the satellite. The second antenna 1020 may be a ground station antenna configured to track the satellite through the RF signal and to communicate with the satellite.

The second transmitter 1100*b* may be configured to transmit the RF signal to the satellite. The second transmitter 1100*b* may include a modulator, an up-converter, and a high power amplifier (HPA). The second receiver 1200*b* may be configured to receive the RF signal from the satellite. The second receiver 1200*b* may include a low noise amplifier (LNA), a down-converter, and a demodulator.

The processor 1500 may be configured to estimate data that is determined to have been transmitted from the satellite using the data received from the first receiver 1200*a* and thereby decoded and the data received from the second receiver 1200*b* and thereby decoded and to transmit the estimated data to a data server 100.

The processor 1500 may include a data processing unit 1510 (e.g., an MCS), a data reformatting unit 1520, and a best source data selection unit 1530. The data processing unit 1510 may be configured to process first data received using optical tracking from the first receiver 1200*a* and second data received using RF signal tracking from the second receiver 1200*b*, in a baseband. Here, in the case of applying a diversity scheme of transferring the same data from the satellite through different communication links, the first data and the second data may be configured as the same data. In contrast, in the case of applying a multiple input multiple output (MIMO) scheme of transferring different data from the satellite through different communication links, the first data and the second data may be configured as different data. Although the diversity scheme using the same data is applied, the first data and the second data may be transferred through different communication links (channels), respectively, and decoded as different data at a time of decoding. Therefore, although the diversity scheme is applied, the decoded data may be different. In this case, which data is to be selected between the first data and the second data becomes an issue. Also, in the case of applying the diversity scheme, a method of setting a weight in signal processing through two links such that data received through two links and thereby decoded may have the same value becomes an issue.

The data processing unit 1510 may be configured to process the first data received using optical tracking from the first receiver 1200*a* and the second data received using RF signal tracking from the second receiver 1200*b*, in the baseband. The data reformatting unit 1520 may be configured to format at least one of the first data and the second data and to match a format and synchronization point in time between the first data and the second data. The demodulator of the second receiver 1200*b* may transfer, to the data processing unit 1510, the second data acquired by demodulating the second signal received from the second receiver 1200*b* to a CCSDS format for space communication. The data reformatting unit 1520 may format the first data processed in the baseband to the CCSDS format. Therefore, the first data and the second data output through the data reformatting unit 1520 may be provided in the same data format. For example, the first data and the second data output through the data reformatting unit 1520 may be provided in the same data format, for example, the CCSDS format. However, the data format is not limited thereto.

The best source data selection unit 1530 may select at least one of the first data and the second data based on a signal quality and a data estimation performance associated with the first data and the second data having the same format and synchronization point in time. The best source data selection unit 1530 may transmit the data selected between the first data and the second data to the data server 100.

Therefore, when the diversity scheme is applied and the decoded data is difference for two links, the best source data selection unit 1530 may select at least one of the first data and the second data based on the signal quality and the data estimation performance associated with the first data and the second data. In contrast, in a MIMO mode in which the first data and the second data differ from each other, the best source data selection unit 1530 may transfer all of the first data and the second data to the data server 100 instead of selecting one of the first data and the second data.

Therefore, when communicating with the satellite 300, whether a diversity mode is to be applied or the MIMO mode is to be applied may be signaled in a predetermined time section. Alternatively, when communicating with the satellite 300, a communication mode, that is, the diversity mode or the MIMO mode, may be signaled in a subsequent time frame through a stable link between first and second links.

The processor 1500 may determine a relatively excellent signal quality between a first signal quality of a first signal that is the optical signal received from the first receiver 1200*a* and a second signal quality of a second signal that is the RF signal received from the second receiver 1200*b*. If one of the first signal quality and the second signal quality is less than or equal to a threshold, the processor 1500 may estimate data transmitted from the satellite using a signal corresponding to the relatively excellent signal quality between the first signal quality and the second signal quality. Here, the signal quality may be one of received signal strength, a signal-to-noise ratio (SNR), a signal-to-interference ratio (SIR), a signal-to-interference plus noise ratio (SINR), and the like, but is not limited thereto.

If all of the first signal quality and the second signal quality are greater than the threshold, the processor 1500 may compare a first data estimation performance estimated from the first signal and a second data estimation performance estimated from the second signal. The processor 1500 may select estimation data of a data source having a relatively excellent estimation performance between the first data estimation performance and the second data estimation performance in a specific time section having different estimation data and may transmit the selected estimation data to the data server 100. In association with the aforementioned operation, the processor 1500 may acquire information through control channel/control data about a communication mode in which the diversity mode is applied in the specific time section The processor 1500 may set a different weight proportional or inversely proportional to the signal quality and may perform data reception and decoding. If all of the first signal quality and the second signal quality are greater than the threshold, the processor 1500 may apply a first weight to the first signal and a second weight to the second signal inversely proportional to the first signal quality and the second signal quality. The processor 1500 may decode data in a state in which the first signal applied with the first weight and the second signal applied with the second weight are combined. For example, with the assumption of sharing the same baseband in the diversity mode in which the same data is transmitted, the processor 1500 may set a weigh to resolve imbalance in a channel state between two channels.

If one of the first signal quality and the second signal quality is greater than the threshold, the processor 1500 may apply the first weight and the second weight to the first signal and the second signal proportional to the first signal quality and the second signal quality. The processor 1500 may decode data in a state in which the first signal applied with the first weight and the second signal applied with the second weight are combined. For example, if only data transferred through one channel is reliable due to imbalance in a channel state between two channels in the diversity mode in which the same data is transmitted, the processor 1500 may set a higher weight to a signal having a relatively excellent signal quality.

The ground station system for performing the RF-FSO linkage method may further include a monitoring controller 1600, such as, for example, a monitoring and control system (MCS). The monitoring controller 1600 may combine with the first communicator 1000*a* and the second communicator 1000*b* in an interoperable manner. The monitoring controller 1600 may monitor the first signal received from the first receiver 1200*a* and the second signal received from the second receiver 1200*b* and may control directions of the first antenna 1010 and the second antenna 1020. Here, the first antenna 1010 and the second antenna 1020 may be configured to be oriented in the same direction. If all of the first signal that is the optical signal and the second signal that is the RF signal have a received signal quality less than or equal to a threshold, the monitoring controller 1600 may change the direction of the second antenna 1020.

To this end, the monitoring controller 1600 may control the first antenna 1010 and the second antenna 1020 to be oriented in the same first direction. If all of the first signal and the second signal have the received signal quality less than or equal to the threshold, the monitoring controller 1600 may control the second antenna 1020 to perform non-line-of-sight wave (NLOS) communication with the satellite by changing the direction of the second antenna 1020 to a second direction.

If the first signal has a received signal quality greater than the threshold, the processor 1500 and/or the monitoring controller 1600 may receive the optical signal from the satellite through the first receiver 1200a in the first direction and may perform line-of-sight wave (LOS) communication with the satellite. The processor 1500 and/or the monitoring controller 1600 may receive the RF signal through the second receiver 1200b from the satellite in a second direction and may perform NLOS communication with the satellite.

The ground station system for performing the RF-FSO linkage method according to an aspect is described above. Hereinafter, the RF-FSO linkage method according to another aspect is described. The aforementioned all of the technical features and configurations may apply to the following ground station system for performing the RF-FSO linkage method.

Figure 7:
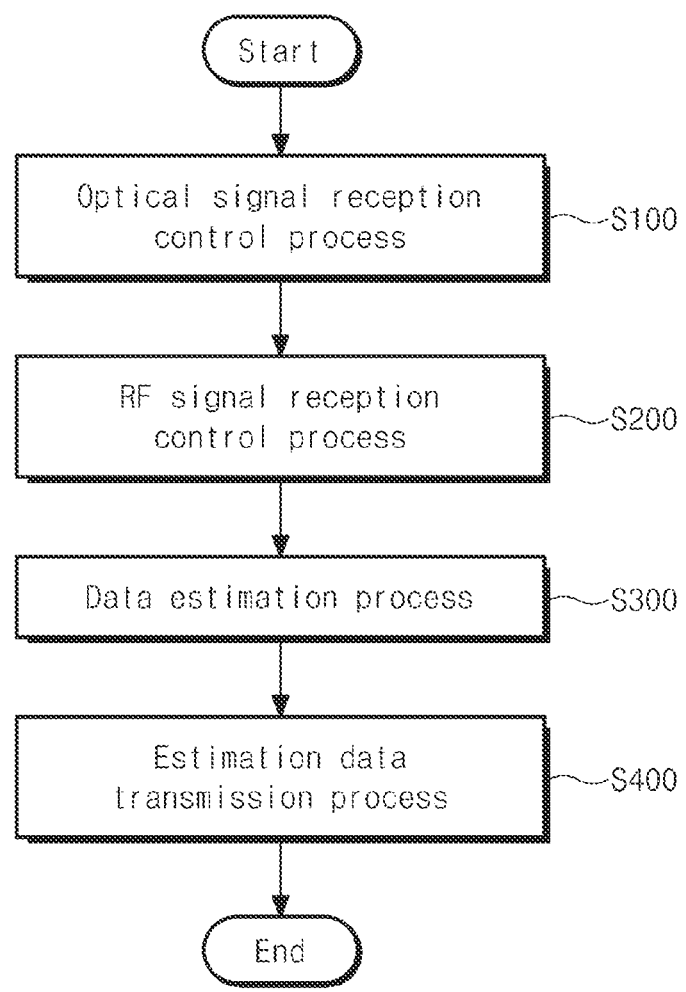
FIG. 7 is a flowchart illustrating an example of an RF-FSO linkage method according to an example embodiment.
Figure 8:
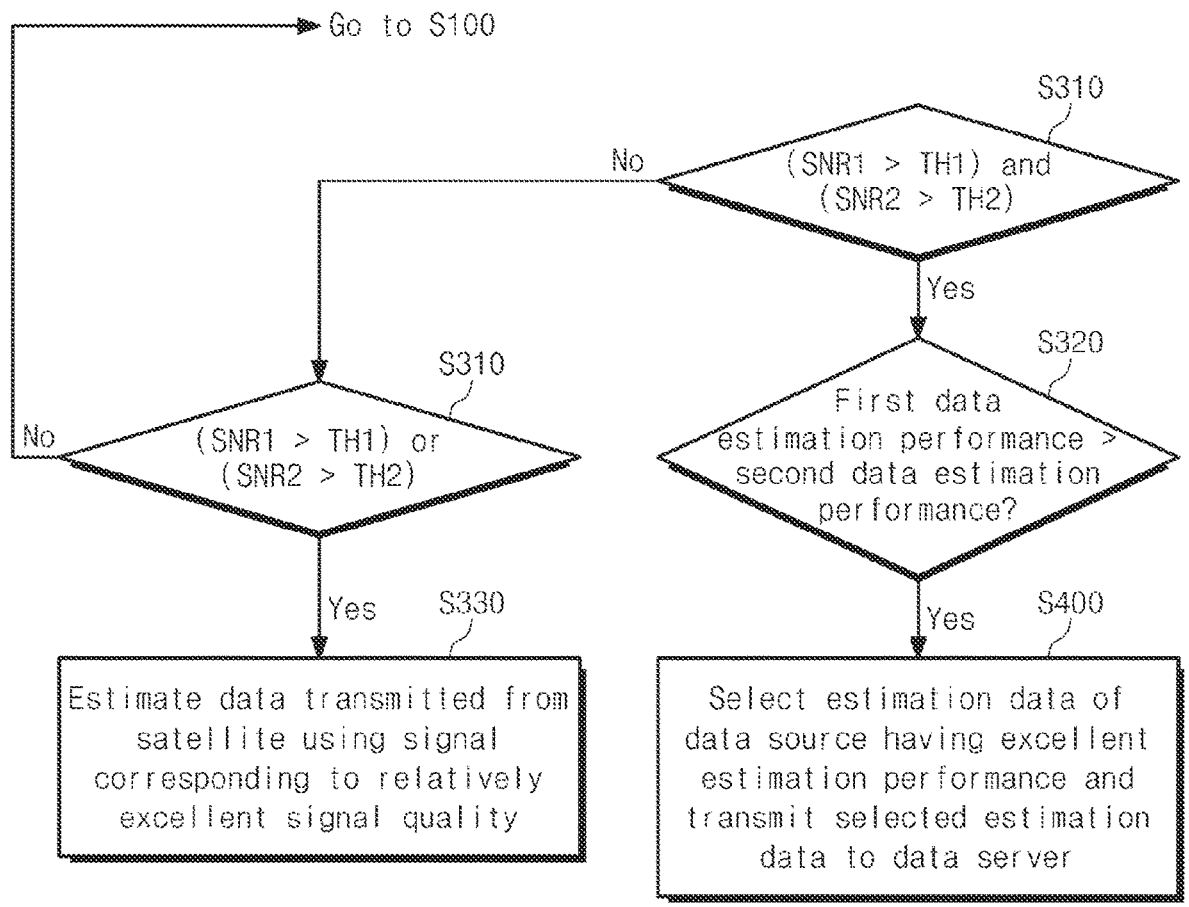
FIG. 8 is a flowchart illustrating an example of a data estimation process in an RF-FSO linkage method according to an example embodiment.

FIG. 7 is a flowchart illustrating an example of an RF-FSO linkage method according to an example embodiment, and FIG. 8 is a flowchart illustrating an example of a data estimation process in an RF-FSO linkage method according to an example embodiment.

Referring to FIGS. 5 to 7, the RF-FSO linkage method according to an example embodiment may be performed by the ground station system. The RF-FSO linkage method may include an optical signal reception control process S100, an RF signal reception control process S200, a data estimation process S300, and an estimation data transmission process S400. The optical signal reception control process S100 and the RF signal reception control process S200 may be simultaneously performed to control a first signal and a second signal to be simultaneously received through an optical link and an RF link from a satellite.

In the optical signal reception control process S100, a first receiver including a first antenna may be controlled to receive an optical signal including data from the satellite. In the RF signal reception control process S200, a second receiver including a second antenna may be controlled to receive an RF signal including data from the satellite.

In the data estimation process S300, data that is determined to have been transmitted from the satellite may be estimated using the data received from the first receiver and thereby decoded and the data received from the second receiver and thereby decoded. In estimation data transmission process S400, estimation data that is determined to have been transmitted from the satellite may be transmitted to a data server.

Referring to FIGS. 5 to 8, the data estimation process S300 may include a signal quality determination process S310, a data estimation performance comparison process S320, and a data estimation process S330. In the signal quality determination process S310, a relatively excellent signal quality may be determined between a first signal quality of a first signal that is the optical signal received from the first receiver and a second signal quality of a second signal that is the RF signal received from the second receiver. Here, although the first signal quality and the second signal quality are represented as SNR1 and SNR2, respectively, the signal quality is not limited to an SNR. The signal quality may include at least one of a received signal strength, an SNR, an SIR, and an SINR, or a combination thereof. In first and second communication links, the first signal quality and the second signal quality may be compared to each other or each signal quality may be compared to a corresponding threshold. That is, all of the first signal quality and the second signal quality may be compared to a threshold Th, or may be compared to a first threshold Th1 or a second threshold Th2.

Therefore, if one of the first signal quality and the second signal quality is less than the threshold, data transmitted from the satellite may be estimated using a signal corresponding to the relatively excellent signal quality between the first signal quality and the second signal quality in the data estimation process S330. If all of the first signal quality and the second signal quality are less than or equal to the threshold, a communication link is unreliable. Therefore, operations followed by the optical signal reception control process S100 may be repeated.

If all of the first signal quality and the second signal quality is greater than the threshold, a first data estimation performance estimated from the first signal and a second data estimation performance estimated from the second signal may be compared in the data estimation performance comparison process S320. Therefore, in the estimation data transmission process S400, estimation data of a data source having a relatively excellent estimation performance may be selected between the first data estimation performance and the second data estimation performance in a specific time section having different estimation data and the selected estimation data may be transmitted to the data server.

The RF-FSO linkage method and the ground station system for performing the same are described. Hereinafter, technical effects of the RF-FSO linkage method and the ground station system for performing the same according to the example embodiments are described.

The aforementioned ground station system for performing the RF-FSO linkage method may maintain a satellite communication link even in poor weather conditions, such as cloud or rain between the earth and a satellite.

The ground station system for performing the aforementioned RF-FSO linkage method may provide satellite communication through another satellite communication link regardless of a degradation in any one satellite communication link performance.

The RF-FSO linkage method according to the example embodiments may be implemented in a form of a program executable by a computer apparatus. For example, the program may include, alone or in combination with program instructions, data files, data structures, and the like. The program may be designed and manufactured using a machine code or a higher level code. The program may be specially designed to implement the RF-FSO linkage method and may be implemented using various functions or definitions well-known and available to those having skill in the computer software arts. Also, a computer apparatus in which the program is executable may include a processor, a memory, and the like to implement functions of the program and, if necessary, may further include a communication apparatus.

The program for implementing the RF-FSO linkage method may be recorded in non-transitory computer-readable media. Examples of the non-transitory computer-readable media may include magnetic media such as hard discs and floppy discs; optical media such as CD-ROM discs and DVDs; magneto-optical media such as floptical discs; and hardware apparatus that are specially configured to store and perform a specific program executed in response to call of a computer, such as ROM, RAM, flash memory.

A number of example embodiments regarding the RF-FSO association method and the ground station system performing the same have been described above. Nonetheless, it should be understood that various modifications may be made to these example embodiments. For example, various apparatuses or methods achieved by one of ordinary skill in the art through alterations and modifications thereto may be an example embodiment of the RF-FSO association method and the ground station system performing the same. For example, suitable results may be achieved if the described techniques are performed in a different order and/or if components in a described system, architecture, apparatus, or circuit are combined in a different manner and/or replaced or supplemented by other components or their equivalents. Accordingly, other implementations are still within the scope of the following claims.

What is claimed is:

1. A ground station system for performing a radio frequency-free space optics (RF-FSO) linkage method, the ground station system comprising:
    a first receiver comprising a first antenna configured to receive an optical signal comprising data from a satellite;
    a second receiver comprising a second antenna configured to receive a radio frequency (RF) signal comprising data from the satellite; and
    a processor configured to estimate data that is determined to have been transmitted from the satellite using the data received from the first receiver and thereby decoded and the data received from the second receiver and thereby decoded and transmit the estimated data to a data server,
    wherein the processor is configured to
    determine a relatively excellent signal quality between a first signal quality of a first signal that is the optical signal received from the first receiver and a second signal quality of a second signal that is the RF signal received from the second receiver, and
    estimate data transmitted from the satellite using a signal corresponding to the relatively excellent signal quality between the first signal quality and the second signal quality if one of the first signal quality and the second signal quality is less than or equal to a threshold, and
    wherein the processor is further configured to
    compare a first data estimation performance estimated from the first signal and a second data estimation performance estimated from the second signal if all of the first signal quality and the second signal quality are greater than the threshold, and
    select estimation data of a data source having a relatively excellent estimation performance between the first data estimation performance and the second data estimation performance in a specific time section having different estimation data and transmit the selected estimation data to the data server.

2. A ground station system for performing a radio frequency-free space optics (RF-FSO) linkage method, the ground station system comprising:
    a first receiver comprising a first antenna configured to receive an optical signal comprising data from a satellite;
    a second receiver comprising a second antenna configured to receive a radio frequency (RF) signal comprising data from the satellite; and
    a processor configured to estimate data that is determined to have been transmitted from the satellite using the data received from the first receiver and thereby decoded and the data received from the second receiver and thereby decoded and transmit the estimated data to a data server,
    wherein the processor is configured to
    determine a relatively excellent signal quality between a first signal quality of a first signal that is the optical signal received from the first receiver and a second signal quality of a second signal that is the RF signal received from the second receiver, and
    estimate data transmitted from the satellite using a signal corresponding to the relatively excellent signal quality between the first signal quality and the second signal quality if one of the first signal quality and the second signal quality is less than or equal to a threshold, and
    wherein the processor is further configured to
    apply a first weight to the first signal and a second weight to the second signal inversely proportional to the first signal quality and the second signal quality if all of the first signal quality and the second signal quality are greater than the threshold, and
    decode data in a state in which the first signal applied with the first weight and the second signal applied with the second weight are combined.

3. A ground station system for performing a radio frequency-free space optics (RF-FSO) linkage method, the ground station system comprising:
    a first receiver comprising a first antenna configured to receive an optical signal comprising data from a satellite;
    a second receiver comprising a second antenna configured to receive a radio frequency (RF) signal comprising data from the satellite; and
    a processor configured to estimate data that is determined to have been transmitted from the satellite using the data received from the first receiver and thereby decoded and the data received from the second receiver and thereby decoded and transmit the estimated data to a data server,
    wherein the processor comprises:
    a data processing unit configured to process first data received using optical tracking from the first receiver and second data received using RF signal tracking from the second receiver, in a baseband; and
    a data reformatting unit configured to format at least one of the first data and the second data and match a format and synchronization point in time between the first data and the second data.

4. The ground station system of claim 3, wherein a demodulator of the second receiver is configured to transfer, to the data processing unit, the second data acquired by demodulating a second signal received from the second receiver to a CCSDS format for space communication, and
    the data reformatting unit is configured to format the first data processed in the baseband to the CCSDS format.

5. The ground station system of claim 3, wherein the processor further comprises:
    a best source data selection unit configured to select at least one of the first data and the second data based on a signal quality and a data estimation performance associated with the first data and the second data having the same format and synchronization point in time and transmit the selected data to the data server.

6. A ground station system for performing a radio frequency-free space optics (RF-FSO) linkage method, the ground station system comprising:
a first receiver comprising a first antenna configured to receive an optical signal comprising data from a satellite;
a second receiver comprising a second antenna configured to receive a radio frequency (RF) signal comprising data from the satellite; and
a processor configured to estimate data that is determined to have been transmitted from the satellite using the data received from the first receiver and thereby decoded and the data received from the second receiver and thereby decoded and transmit the estimated data to a data server,
wherein the first antenna is a ground station telescope configured to track the satellite through the optical signal and perform line-of-sight wave (LOS) communication with the satellite, and
the second antenna is a ground station antenna configured to track the satellite through the RF signal and perform communication with the satellite.

7. A ground station system for performing a radio frequency-free space optics (RF-FSO) linkage method, the ground station system comprising:
a first receiver comprising a first antenna configured to receive an optical signal comprising data from a satellite;
a second receiver comprising a second antenna configured to receive a radio frequency (RF) signal comprising data from the satellite;
a processor configured to estimate data that is determined to have been transmitted from the satellite using the data received from the first receiver and thereby decoded and the data received from the second receiver and thereby decoded and transmit the estimated data to a data server;
a first transmitter configured to transmit the optical signal to the satellite; and
a second transmitter configured to transmit the RF signal to the satellite,
wherein the first receiver and the first transmitter constitute a first communicator, and the second receiver and the second transmitter constitute a second communicator, and
the first antenna and the second antenna are configured to be oriented in the same direction and change a direction of the second antenna if all of a first signal that is the optical signal and a second signal that is the RF signal have a received signal quality less than or equal to a threshold.

8. The ground station system of claim 7, further comprising:
a monitoring controller configured to combine with the first communicator and the second communicator in an interoperable manner, monitor the first signal received from the first receiver and the second signal received from the second receiver, and control directions of the first antenna and the second antenna,
wherein the monitoring controller is configured to control the first antenna and the second antenna to be oriented in the same first direction, and
control the second antenna to perform non-line-of-sight wave (NLOS) communication with the satellite by changing the direction of the second antenna to a second direction if all of the first signal and the second signal have the received signal quality less than or equal to the threshold.

9. The ground station system of claim 7, wherein the processor is configured to
receive the optical signal from the satellite through the first receiver in a first direction and perform LOS communication with the satellite if the first signal has a received signal quality greater than the threshold, and
receive the RF signal from the satellite through the second receiver in a second direction and perform NLOS communication with the satellite.

10. A radio frequency-free space optics (RF-FSO) linkage method performed by a ground station system, the method comprising:
an optical signal reception control process of controlling a first receiver comprising a first antenna to receive an optical signal comprising data from a satellite;
an RF signal reception control process of controlling a second receiver comprising a second antenna to receive an RF signal comprising data from the satellite;
a data estimation process of estimating data that is determined to have been transmitted from the satellite using the data received from the first receiver and thereby decoded and the data received from the second receiver and thereby decoded and transmit the estimated data to a data server; and
an estimation data transmission process of transmitting estimation data that is determined to have been transmitted from the satellite to the data server,
wherein the data estimation process further comprises a signal quality determination process of determining a relatively excellent signal quality between a first signal quality of a first signal that is the optical signal received from the first receiver and a second signal quality of a second signal that is the RF signal received from the second receiver, and
the data estimation process comprises estimating data transmitted from the satellite using a signal corresponding to the relatively excellent signal quality between the first signal quality and the second signal quality if one of the first signal quality and the second signal quality is less than or equal to a threshold, and
wherein the data estimation process further comprises a data estimation performance comparison process of comparing a first data estimation performance estimated from the first signal and a second data estimation performance estimated from the second signal if all of the first signal quality and the second signal quality are greater than the threshold, and
the estimation data transmission process comprises selecting estimation data of a data source having a relatively excellent estimation performance between the first data estimation performance and the second data estimation performance in a specific time section having different estimation data and transmitting the selected estimation data to the data server.

* * * * *